United States Patent
Huang et al.

(10) Patent No.: US 8,831,151 B2
(45) Date of Patent: Sep. 9, 2014

(54) METHOD AND ASSOCIATED APPARATUS OF DATA EXTRACTION

(75) Inventors: Yen-Yin Huang, Taoyuan County (TW); Chien-Heng Wong, Taipei (TW); Ming-Shih Yu, New Taipei (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 168 days.

(21) Appl. No.: 13/535,948

(22) Filed: Jun. 28, 2012

(65) Prior Publication Data

US 2013/0039450 A1 Feb. 14, 2013

(30) Foreign Application Priority Data

Aug. 8, 2011 (TW) ............................. 100128238 A

(51) Int. Cl.
  *H04L 27/06* (2006.01)
  *H04L 7/04* (2006.01)
  *H04L 7/033* (2006.01)
  *H04L 25/06* (2006.01)

(52) U.S. Cl.
  CPC .............. *H04L 7/0331* (2013.01); *H04L 25/06* (2013.01); *H04L 7/04* (2013.01)
  USPC ........................................................ 375/343

(58) Field of Classification Search
  None
  See application file for complete search history.

(56) References Cited

U.S. PATENT DOCUMENTS

| | | | |
|---|---|---|---|
| 5,313,496 A * | 5/1994 | de Goede | 375/342 |
| 5,799,050 A | 8/1998 | Morita | |
| 5,907,587 A * | 5/1999 | Sokoler | 375/368 |
| 6,407,641 B1 | 6/2002 | Williams et al. | |
| 6,556,640 B1 * | 4/2003 | Baba | 375/376 |
| 6,891,906 B1 * | 5/2005 | Sogabe et al. | 375/343 |
| 6,990,615 B2 * | 1/2006 | Goudie | 714/709 |
| 7,167,532 B1 * | 1/2007 | Bronfer et al. | 375/355 |
| 7,324,619 B2 | 1/2008 | Tsai et al. | |
| 7,453,958 B2 | 11/2008 | Greco et al. | |
| 7,991,096 B1 * | 8/2011 | Kim et al. | 375/355 |
| 8,014,480 B1 * | 9/2011 | Zhuang et al. | 375/355 |
| 2003/0174795 A1 * | 9/2003 | Bruhnke et al. | 375/354 |
| 2008/0304599 A1 * | 12/2008 | Furtner | 375/340 |
| 2009/0180783 A1 * | 7/2009 | Huang et al. | 398/155 |

* cited by examiner

*Primary Examiner* — Chieh M Fan
*Assistant Examiner* — Bahman Badipour
(74) *Attorney, Agent, or Firm* — Winston Hsu; Scott Margo

(57) ABSTRACT

Method and associated apparatus of data extraction, including: sampling a signal and obtaining a plurality of sampled values, providing a reference sample quantity when the sampled values transit, providing a unit bit sample quantity according to the reference sample quantity, and corresponding each of the sampled values to each data bit of the signal according to the unit bit sample quantity.

11 Claims, 5 Drawing Sheets

METHOD AND ASSOCIATED APPARATUS OF DATA EXTRACTION

This application claims the benefit of Taiwan Patent Application Serial No. 100128238, filed Aug. 8, 2011, the subject matter of which is incorporated herein by reference.

FIELD OF THE INVENTION

The present invention relates to a method and associated apparatus of data extraction, and more particularly, to a method and associated apparatus capable of extracting data bits and/or data clock without locking to the data clock.

BACKGROUND OF THE INVENTION

Electronic devices exchange interface signals; each interface signal carries digital data, so the electronic devices can establish communications of messages and information. When a transmitting electronic device sends digital data to a receiving electronic device, the transmitting electronic device serializes data bits of the digital data in an interface signal based on a data clock, and transmits the interface signal to the receiving electronic device. As the interface signal is received, the receiving electronic device needs to perform data extraction for the interface signal, thus each data bit of the interface signal can be retrieved, and the messages and information in the digital data of the transmitting electronic device are recovered.

For different electronic devices to correctly exchange data, digital data are carried by an interface signal according to a predetermined interface protocol/specification, such as various versions of the universal serial bus (USB) specification, the serial advance technology attachment (SATA) specification and the peripheral component interconnect express (PCI-E) specification, etc. In modern interface specification, digital data are packed into packets, and the packet forms a basic unit for data exchange. However, in modern interface specification, the data clock is not transmitted to the receiving electronic device along with the interface signal. The receiving electronic device must extract each data bit without the data clock.

For demands of data extraction, a prior art, such as the one mentioned in U.S. Pat. No. 5,799,050, utilizes crystal oscillator to provide a precise clock and accordingly performs data extraction. However, because crystal oscillators can not be integrated into dice of integrated circuits, a die needs additional pins to receive the clock of the crystal oscillator, thus cost and power consumption of the prior art are increased.

In another kind of prior arts, such as those mentioned in U.S. Pat. Nos. 7,453,958 and 6,407,641, a rough clock close to the data clock is first provided, then it is fine-tuned to be closer to the data clock. However, this kind of prior arts is sensitive to variations of (manufacturing) process, (supply) voltage and (operation) temperature. If the rough clock is far away from the data clock, it is difficult, or time-consuming, to fine-tune the rough clock to approximate the data clock. In addition, this kind of prior art lacks application flexibility, since a same data extraction design does not apply to different interface specifications. Because different interface specifications adopt clocks of different rates and packets of different lengths, demanded clock precisions for data extraction are also different. For example, as packet is longer (contains more data bits), the clock used for data extraction needs to be more precise. Therefore, a same fine-tuning mechanism can not apply to interfaces of different interface specifications.

SUMMARY OF THE INVENTION

The present invention relates to a method and associated apparatus performing data extraction for a signal (an interface signal), so as to retrieve data bits carried by the signal.

An objective of the invention is providing a method for extracting data from a signal; the signal includes a plurality of data bits, and the method includes: sampling the signal to obtain a plurality of sampled values, providing a reference sample quantity when consecutive sampled values transit, providing a unit bit sample quantity according to the reference sample quantity, and corresponding each sampled value to each data bit according to the unit bit sample quantity.

Another objective of the invention is providing an apparatus of data extraction for extracting data from a signal, as well as extracting timing (frequency and/or phase) of the data clock. In an embodiment, the apparatus includes a unit bit detector, a decoder, a buffer, a pattern recognizer, a counter, a frequency compensator and a clock generator.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
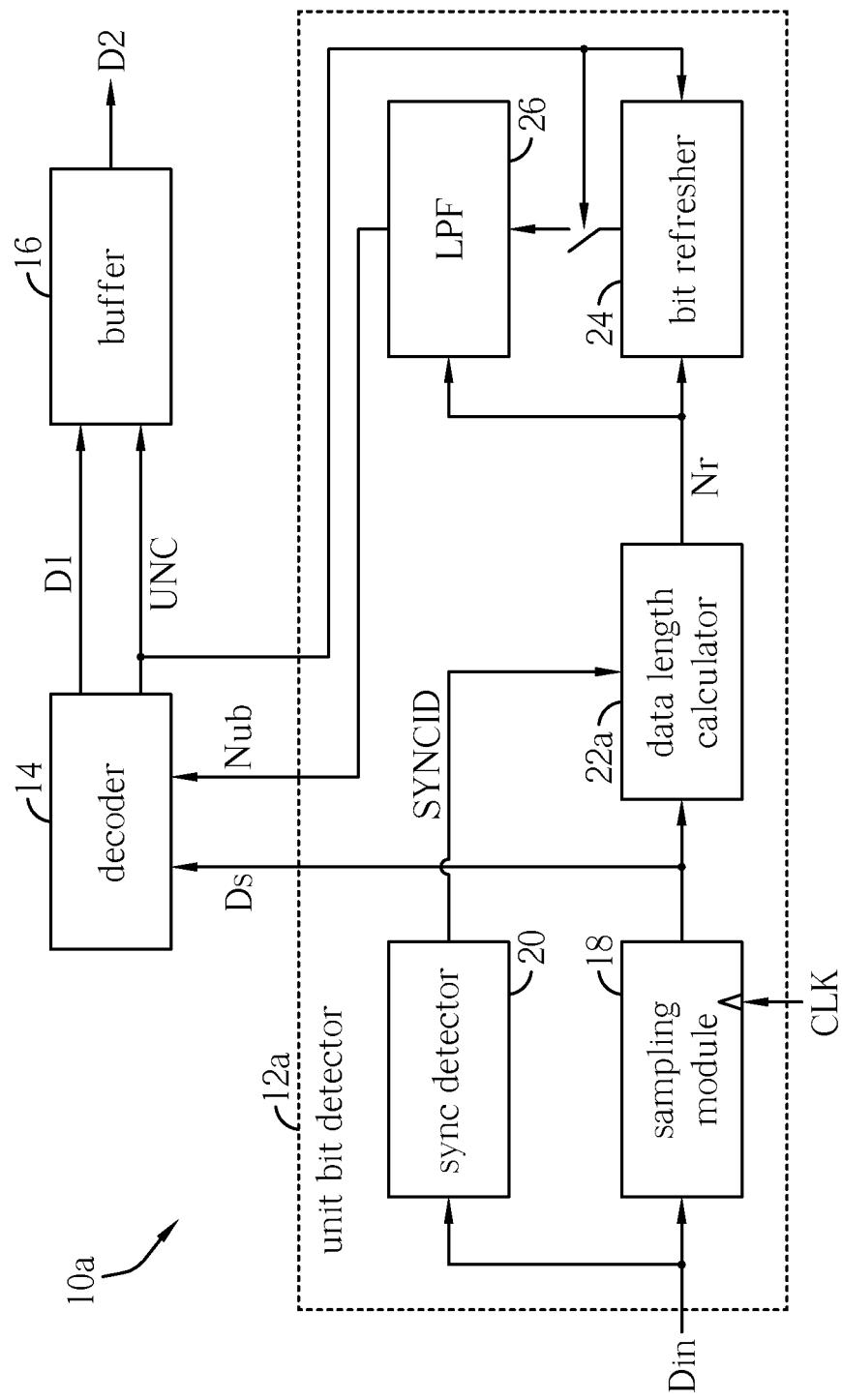
FIG. 1 illustrates an apparatus according to an embodiment of the invention.

Please refer to FIG. 1 illustrating an apparatus 10a according to an embodiment of the invention; the apparatus 10a can be integrated in a die (chip) for extracting data carried by a signal Din, and thus identifying each bit (data bit) of the signal Din. For example, the signal Din can include a pair of differential interface signals. The apparatus 10a includes a unit bit detector 12a, a decoder 14 and a buffer 16. The unit bit detector 12a includes a sampling module 18, a sync detector 20, a data length calculator 22a, a bit refresher 24 and a low-pass filter (LPF) 26.

In the unit bit detector 12a, the sampling module 18 is coupled to the signal Din and a sampling clock CLK, and is arranged to sample (e.g., over-sample) the signal Din on triggering of the sampling clock CLK for obtaining a plurality of sampled values; these sampled values are then sequentially listed in data Ds. The sampling module 18 is also coupled to the data length calculator 22a and the decoder 14. In an embodiment, the sampling clock CLK causes the sampling module 18 to obtain multiple sampled values for each data bit during each period (cycle) of the data clock. The sampling clock can be generated by a free-running digital oscillator (not shown); the sampling clock does not need to precisely synchronize with data clock, and the frequency of the sampling clock does not need to be a precise multiple of data clock. Even so, the apparatus 10a of the invention can still perform accurate data extraction.

The sync detector 20 is coupled to the signal Din and the data length calculator 22a. In modern interface specification, the start of each packet carries a sync sequence to facilitate data extraction of the receiving electronic device. For example, in USB specification, a sync sequence of the signal Din starts with a SE0 (single ended zero) signal status, then a serial bit stream follows, wherein the bit stream is of fixed bit length (fixed number of bits), and has a specific transition pattern, e.g., a pattern with transitions between every two consecutive bits. The sync detector 20 in the unit bit detector 12a is arranged to identify sync sequences in the signal Din, and to trigger a signal SYNCID when a sync sequence is identified. That is, when the signal SYNCID is triggered, the sampled values in the data Ds are obtained by sampling a sync sequence.

The data length calculator 22a is coupled to the sampling module 18, the sync detector 20, the bit refresher 24 and the LPF 26. When the sync detector 20 triggers the signal SYNCID, the data length calculator 22a provides a quantity Nr as a reference sample quantity on each transition between consecutive sampled values in the data Ds. For example, when the signal SYNCID is triggered, if the (n+1)-th sampled value to the (n+Nr1)-th sampled value are of the same logic value, but the (n+Nr1+1)-th sampled value transits to another logic value, then the data length calculator 22a provides the quantity Nr1 as a reference sample quantity. Similarly, if the following (n+Nr1+1)-th to (n+Nr1+Nr2)-th sampled values are of the same logic value but the (n+Nr1+Nr2+1)-th sampled value transits to a different logic value, the data length calculator 22a provides the quantity Nr2 as another reference sample quantity. The quantities Nr (e.g., the quantities Nr1 and Nr2) are transmitted to the LPF 26.

In an embodiment, the LPF 26 is a digital low-pass filter (e.g., a numeric accumulator) for obtaining a quantity Nub by performing long-term averaging on the quantities Nr provided by the data length calculator 22a; the quantity Nub is a unit bit sample quantity to indicate the number of sampled values within each data bit of the signal Din. Due to the transition pattern of sync sequence, the unit bit sample quantity can be obtained according to the quantities Nr provided by the data length calculator 22a. For example, assuming the transition pattern of sync sequence has a transition between every two consecutive data bits, if there is no transition between a series of sampled values, then the number of these sampled values corresponds to a data bit. For instance, in a sync sequence, if a transition occurs between the n-th and the (n+1)-th sampled values, and a next transition occurs between the (n+Nr1)-th and the (n+Nr1+1)-th sampled values, then the Nr1 sampled values from the (n+1)-th sampled value to the (n+Nr1)-th sampled value are sampled from a same data bit. According to the principle, the unit bit detector 12a can provide a sample quantity Nub corresponding to a single data bit.

Figure 2:
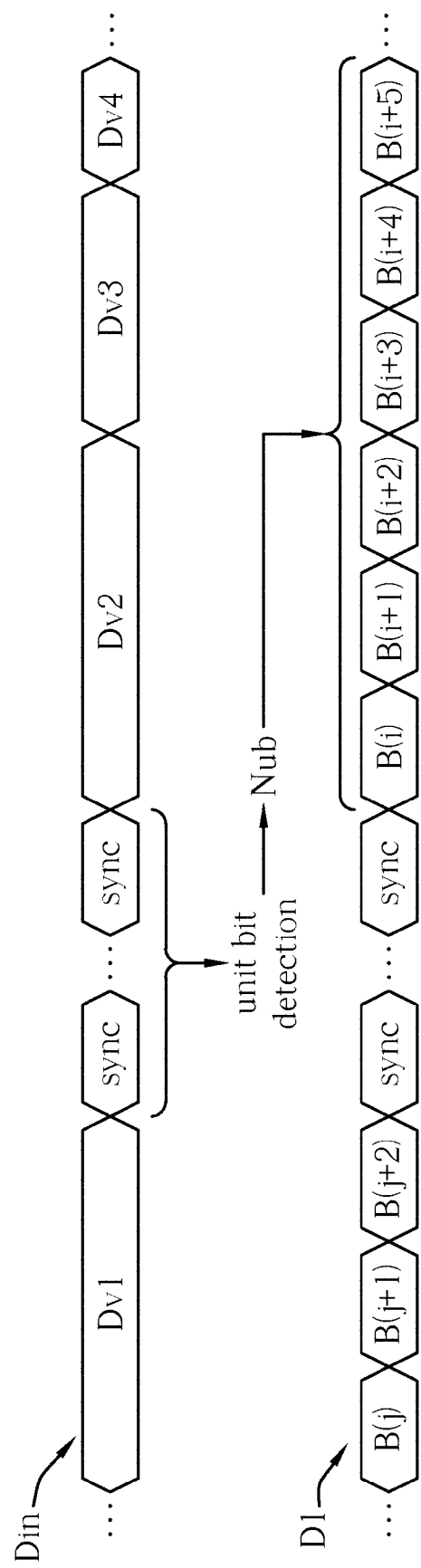
FIG. 2 illustrates operation of the decoder in FIG. 1 according to an embodiment of the invention.

The decoder 14 is coupled between the sampling module 18 and the LPF 26, for respectively associating the sampled values in the data Ds with the data bits of the signal Din according to the unit bit sample quantity Nub, i.e., performing a preliminary data extraction, and accordingly providing data D1. Please refer to FIG. 2 illustrating decoding operation of the decoder 14 according to an embodiment of the invention. The signal Din includes bit streams such as Dv1 to Dv4, also includes bits "sync" of a sync sequence. Each of the bit streams Dv1 to Dv4 contains data bit(s) of a same logic value, thus number of data bits in each bit stream can not be distinguished without data clock. However, the unit bit detector 12a can detect the sample quantity Nub of each data bit according to the bits "sync" of the sync sequence, so the decoder 14 can correspond every Nub sampled values to a data bit, and each bit of the signal Din can therefore be distinguished from the data D1. For example, according to the quantity Nub, it is distinguished that the bit stream Dv1 includes data bits B(j) to B(j+2) of a same logic value, the bit stream Dv2 includes data bits B(i) to B(i+2) of a same logic value, the bit stream Dv3 has two data bits B(i+3) to B(i+4), and the bit stream Dv4 has a data bit B(i+5).

When the decoder 14 associates the sampled values with the data bits, if a first number of continuous sampled values are of a same logic value, but the first number deviates from integer multiple of the quantity Nub (e.g., a difference between any integer multiple of the quantity Nub and the first number is not less than a predetermined value), then it means an unsolved situation happens during bit decoding; when the unsolved situation happens, the decoder 14 triggers a signal UNC as an indication signal. For example, assuming the quantity Nub equals 10, if the first number is 21 or 19 which is close to twice of the quantity Nub, it suggests that there are two data bits within the first number of sampled values, thus bit decoding can be performed as normal, and the unsolved situation does not happen. On the other hand, if the quantity Nub is 10 but the first number is 25, then the first number deviates from integer multiple of the quantity Nub and the unsolved situation happens, because the first number is not close to either 20 (twice of the quantity Nub) or 30 (triple of the quantity Nub). The unsolved situation is caused by factors such as jitters in the signal Din; when the unsolved situation happens, the decoder 14 triggers the signal UNC.

The unsolved situation indicates that the quantity of sampled values included in a data bit changes; for example, when the signal Din suffers considerable interference, the unsolved situation happens. The buffer 16 and the bit refresher 24 are arranged to solve the aforementioned unsolved situation. Please refer to FIG. 1 again. The buffer 16 is coupled to the decoder 14 for buffering (storing) a plurality of sampled values and unit bits. For example, when the decoder 14 decodes the n-th sampled value and the following sampled values (e.g., the (n+1)-th sampled value, etc.), the buffer 16 stores previous N sampled values, i.e., the (n−N)-th to the (n−1)-th sampled values, wherein the quantity N is a predetermined number. When the signal UNC is not triggered, the buffer 16 provides data D2 which is a delayed duplicate of the data D1, and the delay latency is determined by the quantity of buffered sampled values (i.e., the quantity N).

The bit refresher 24 in the unit bit detector 12a is coupled to the data length calculator 22a, the decoder 14 and the LPF 26. When the signal UNC is triggered, the bit refresher 24 causes the LPF 26 to reset the unit bit sample quantity according to the indication signal UNC. For example, the bit refresher 24 can cause the LPF 26 to clear previously (before the signal UNC is triggered) accumulated average quantity Nub, and to restart accumulating new quantities Nr provided after the signal UNC is triggered. Or, the bit refresher 24 can cause the LPF 26 to continue accumulating with the previously obtained quantity Nub less weighted, thus influence of the previously accumulated quantity is reduced for later accumulated quantity.

When the signal UNC is triggered, the buffer 16 remaps the buffered sampled values to the data bits according to the new unit bit sample quantity Nub reset by the bit refresher 24 and the LPF 26, and outputs the remapped results to the data D2. Thus, the unsolved situation is solved and corrected. That is, the buffer 16 works as a refresh buffer to enhance error tolerance of the apparatus 10a.

As shown in FIG. 2, data extraction of the invention can be open-looped; there is no need to control the sampling clock CLK by closed feedback loop. If the sampling clock does not precisely synchronize with the data clock, the quantity of sampled values included in each data bit of the signal Din gradually varies with time, but the unit bit detector 12a also keeps on updating the unit bit sample quantity whenever sync sequence is detected, thus the decoder 14 can extract data correctly according to the continuing updated unit bit sample quantity. For the same reason, data extraction of the invention gains better ability to resist variation of process, voltage and temperature; even timing of the sampling clock CLK drifts, data extraction executes accurately. Similarly, data extraction of the invention can be generalized to different interface specifications; even an interface specification adopts packets of long bit length (many data bits), data extraction of the invention applies well.

Figure 3:
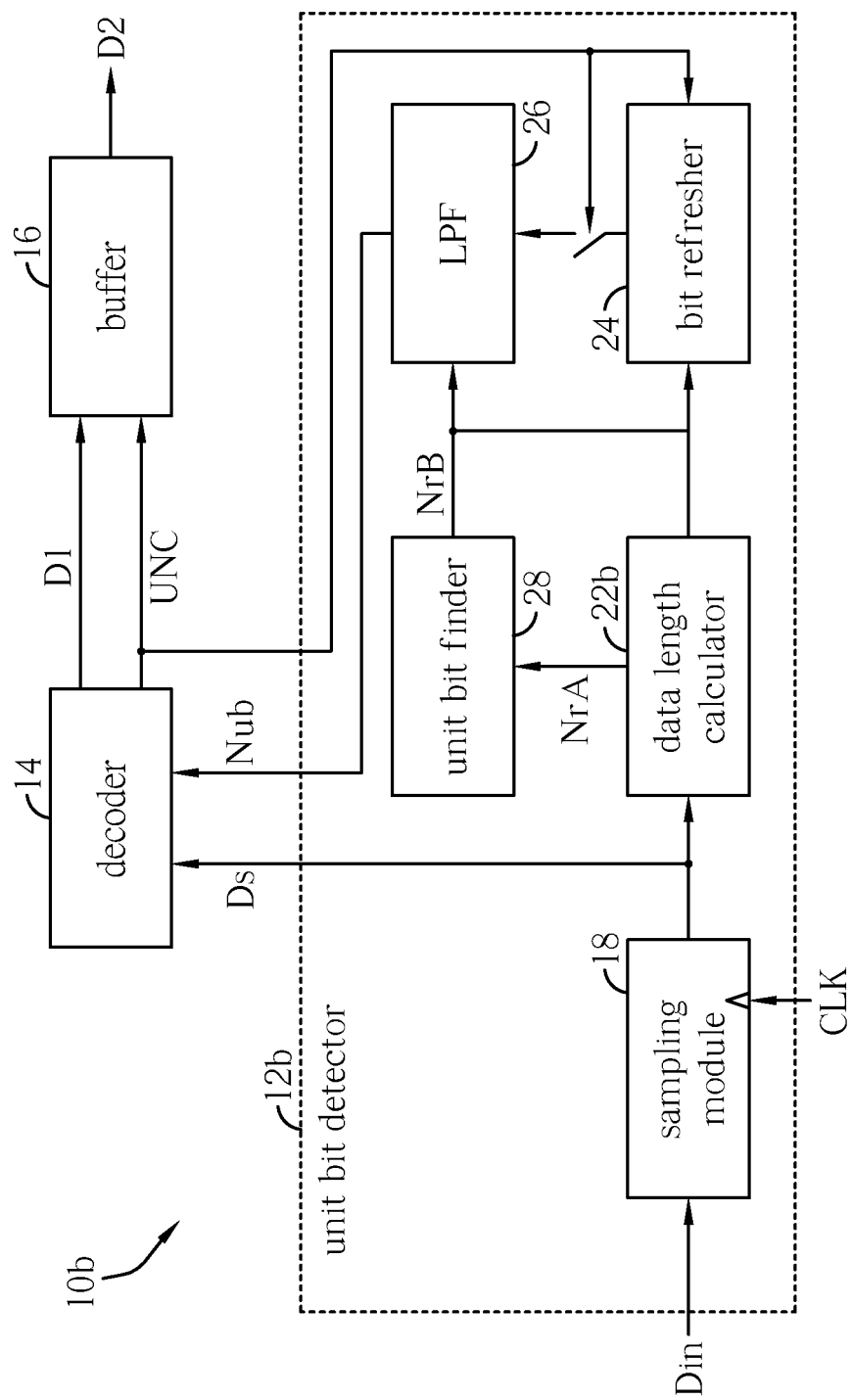
FIG. 3 illustrates an apparatus according to another embodiment of the invention.

In the embodiment of FIG. 1, the unit bit detector 12a determines the unit bit sample quantity Nub according to detection of the sync sequences. In addition, the invention can perform data extraction directly according to data bits of the signal Din. Please refer to FIG. 3 illustrating an apparatus 10b according to an embodiment of the invention; the apparatus 10b can be integrated in a die to extract data carried by a signal Din, and to distinguish each bit (data bit) of the signal Din. The apparatus 10b includes a unit bit detector 12b, a decoder 14 and a buffer 16. The unit bit detector 12b includes a sampling module 18, a data length calculator 22b, a unit bit finder 28, a bit refresher 24 and an LPF 26.

In the unit bit detector 12b, the sampling module 18 is coupled to the signal Din and a sampling clock CLK, and is arranged to sample the signal Din on triggering of the sampling clock CLK and accordingly obtain a plurality of sampled values to be transmitted in data Ds. The sampling module 18 is also coupled to the data length calculator 22b and the decoder 14. In an embodiment, the sampling clock CLK causes the sampling module 18 to obtain multiple sampled values during each data bit.

The data length calculator 22b is coupled to the sampling module 18 and the unit bit finder 28. When the sampled values in the data Ds transit, the data length calculator 22b provides a quantity NrA as a reference sample quantity. For example, if there is a transition between the n-th and (n+1)-th sampled values of the data Ds, the (n+1)-th to the (n+Nr1)-th sampled values are of the same logic value, but the (n+Nr1+1)-th sampled value transits to another logic value, then the data length calculator 22b provides the quantity Nr1 as a reference sample quantity. Similarly, if the following (n+Nr1+1)-th to (n+Nr1+Nr2)-th sampled values are of the same logic value but the (n+Nr1+Nr2+1)-th sampled value transits to a different logic value, the data length calculator 22b provides the quantity Nr2 as another reference sample quantity. The quantities NrA (e.g., the quantities Nr1 and Nr2) provided by the data length calculator 22b are transmitted to the unit bit finder 28.

The unit bit finder 28 is coupled to the data length calculator 22b and the LPF 26. To identify each data bit in the signal Din, the unit bit detector 12b provides a unit bit sample quantity Nub to indicate how many sampled values are included within a single data bit. Because the data length calculator 22b provides the reference sample quantities NrA on transitions between the sampled values, each quantity NrA is an integer multiple of the quantity Nub. For example, if there is a transition between i-th to (i+1)-th data bits of the signal Din, all the (i+1)-th to (i+M1)-th data bits are of a first logic value, there is another transition between the (i+M1)-th to (i+M1+1)-th data bits, the (i+M1+1)-th to (i+M1+M2)-th data bits are of a second logic value, and there is again a transition between the (i+M1+M2)-th to (i+M1+M2+1)-th data bits, then the data length calculator 22b will respectively provide two quantities Nr1=M1*Nub and Nr2=M2*Nub as the outputted quantities NrA. Although the quantities M1, M2 and Nub are unknown, the quantity Nub will be a common factor (common divisor) of the quantities Nr1 and Nr2. Based on merely several quantities NrA, the quantity Nub can be rapidly found by the Euclidean algorithm. The unit bit finder 28 applies such principle to find the unit bit sample quantity Nub. The unit bit finder 28 can compare a plurality of reference sample quantities NrA, such that the unit bit detector 12b can provide the unit bit sample quantity Nub according to the comparison result. For example, the unit bit finder 28 computes a common factor of a plurality of reference sample quantities NrA, and the unit bit detector 12b can therefore provide the quantity Nub according to the common factor.

Figure 4:
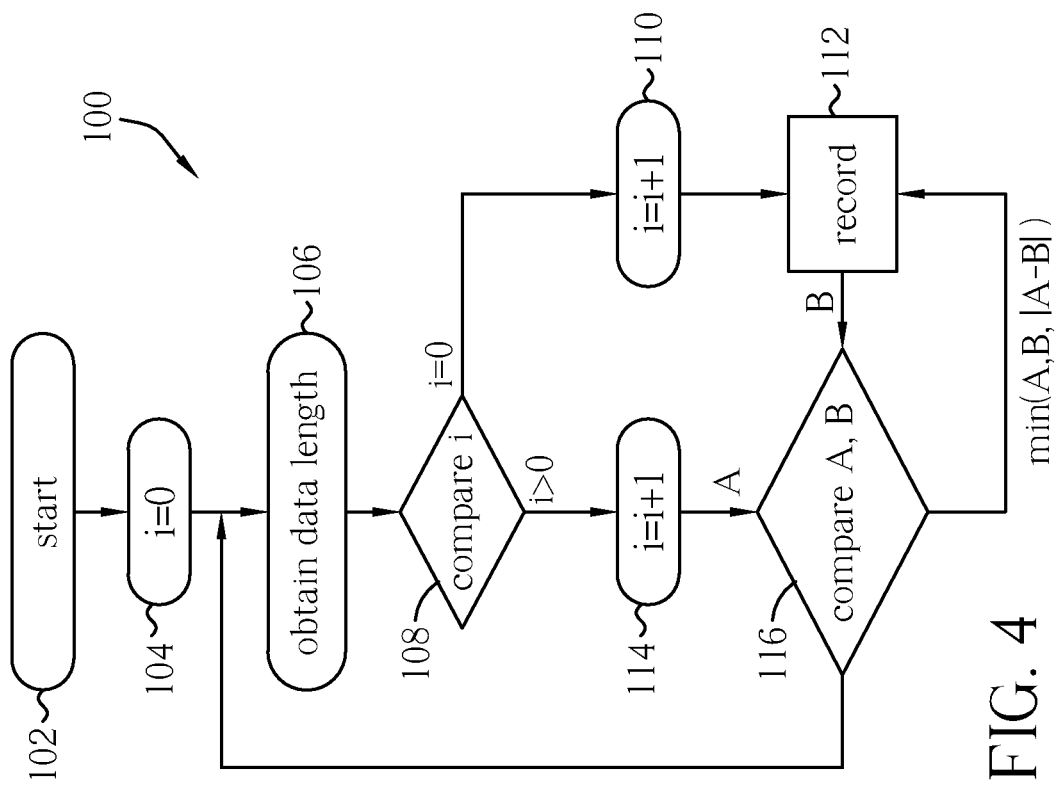
FIG. 4 illustrates a flow applied to the unit bit finder in FIG. 3 according to an embodiment of the invention.

Please refer to FIG. 4 illustrating an operation flow 100 of the unit bit finder 28 according to an embodiment of the invention. The flow 100 includes the following steps.

Step 102: start. When the apparatus 10b starts to operate, the flow 100 can be started.

Step 104: set an index i to an initial value (0 for example). The index i indicates the number of iterating the flow 100.

Step 106: obtain a quantity NrA (i.e., a data length) from the data length calculator 22b.

Step 108: compare the value of the index i. If the index i equals the initial value, proceed to the step 110; if the index i is greater than the initial value, proceed to the step 114.

Step 110: increment the value of the index i.

Step 112: record a quantity B.

Step 114: increment the index i. The quantity NrA obtained in the step 106 is recorded as a quantity A.

Step 116: compare the quantities A and B, so the minimum among the three quantities: A, B, a difference between the quantities A and B is recorded as the quantity B. Then iterate to the steps 106 and 112.

Operation of the unit bit finder 28 is explained by the following example. It is assumed that the data length calculator 22b sequentially provides three quantities 3*Nub, 6*Nub and 4*Nub as data lengths. The first quantity 3*Nub is recorded as the quantity B after the steps 108, 110 and 112. The second quantity 6*Nub experiences the steps 108 and 114 to be recorded as the quantity A, and the quantity 3*Nub is recorded as the quantity B after the step 116. For the third quantity 4*Nub, it becomes the quantity A after the steps 108 and 114, and is compared to the quantity B during the step 116, thus a quantity 1*Nub (a difference between 4*Nub and 3*Nub) is recorded as the quantity B, which is the unit bit sample quantity Nub. In modern interface specification, there is a bottom limit on how frequently bit transitions occur, so the flow 100 can rapidly converge to accurate unit bit sample quantity. For example, in the USB specification, there is at least one transition every 6 consecutive data bits; that is, the quantity NrA provided by the data length calculator 22b has an upper bound of 6*Nub.

Please refer to FIG. 3 again. The unit bit finder 28 provides the quantity B of the flow 100 as the reference sample quantity NrB; the LPF 26 is coupled to the unit bit finder 28 for calculating a long-term average of the quantities NrB and accordingly providing the unit bit sample quantity Nub. The decoder 14 is coupled to the sampling module 14 and the LPF 26, and associates the sampled values of the data Ds to data bits according to the quantity Nub. Similar to the apparatus 10a shown in FIG. 1, the embodiment shown in FIG. 3 also includes a buffer 16 and a bit refresher 24; cooperation of the decoder 14, the buffer 16 and the bit refresher 24 can be derived according to FIG. 1.

The apparatus 10b is able to extract data without identifying sync sequences. Similar to the apparatus 10a in FIG. 1, the apparatus 10b in FIG. 3 does not need to control frequency and phase of the sampling clock CLK by feedback, and the sampling clock CLK does not need to precisely synchronize with the data clock. As the data length calculator 22b and the unit bit finder 28 keep on operating, the unit bit detector 12b can keep on updating the unit bit sample quantity Nub.

Figure 5:
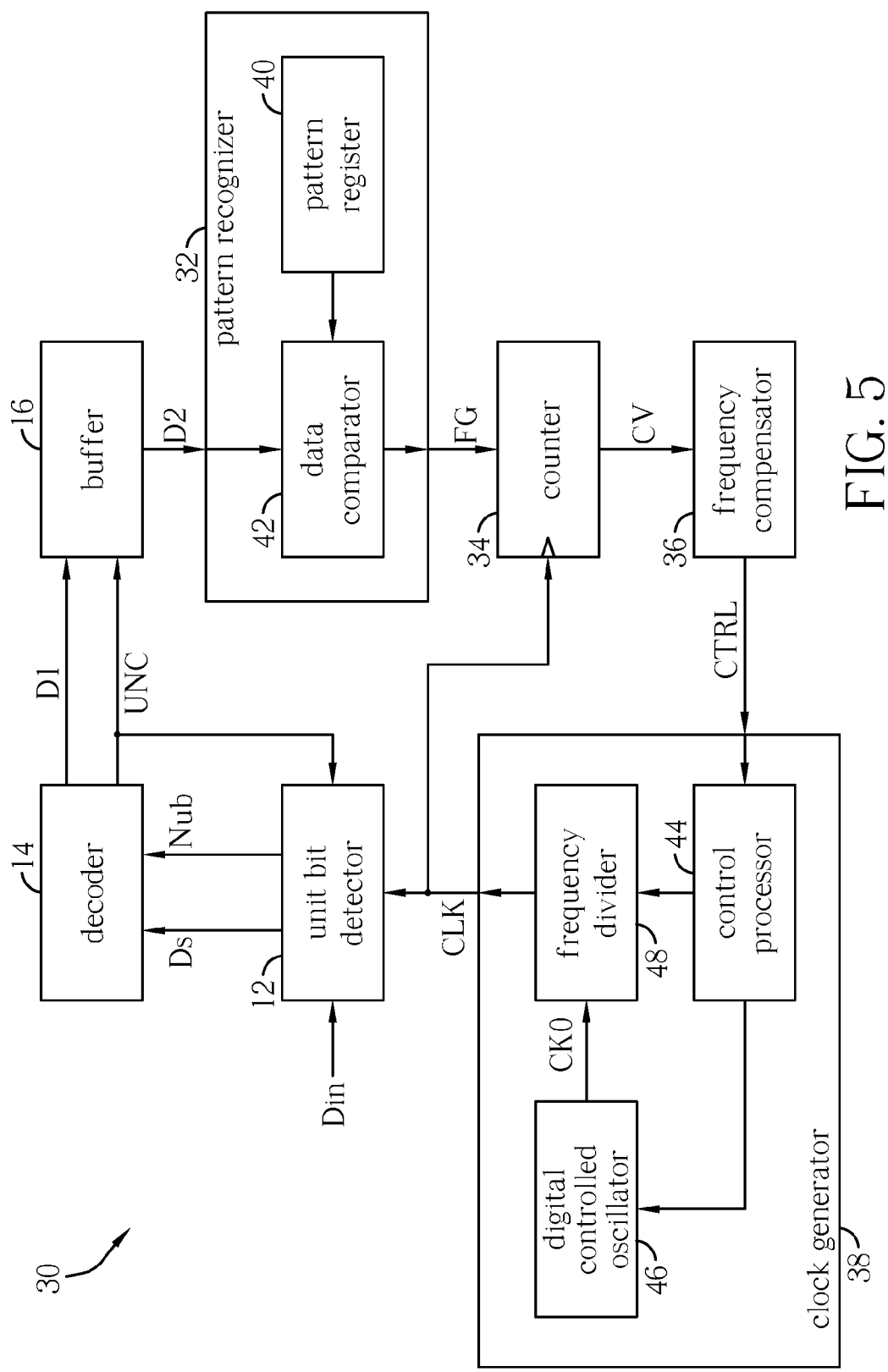
FIG. 5 illustrates an apparatus according to an embodiment of the invention.

Data extraction of the invention can be expanded to extract one or more timings. Please refer to FIG. 5 illustrating an apparatus 30 according to an embodiment of the invention. The apparatus 30 can be integrated in a die to extract data carried in a signal Din by indentifying each data bit of the signal Din, and accordingly extract one or more related timings/clocks. The signal Din can be formed by a pair of differential interface signals.

The apparatus 30 includes a unit bit detector 12, a decoder 14, a buffer 16, a pattern recognizer 32, a counter 34, a frequency compensator 36 and a clock generator 38. The pattern recognizer 32 includes a pattern register 40 and a data comparator 42. In an embodiment, the clock generator 38 is a full digital clock generator, and includes a control processor 44, a digital controlled oscillator 46 and a frequency divider 48.

In the apparatus 30, the unit bit detector 12 is coupled to the signal Din, the decoder 14 and the clock generator 38. The decoder 14 is coupled to the unit bit detector 12 and the buffer 16. The buffer 16 is coupled to the decoder 14 and the pattern recognizer 32. The pattern recognizer 32 is coupled to the buffer 16 and the counter 34, and the counter 34 is coupled to the pattern recognizer 32 and the frequency compensator 36. The frequency compensator 36 is coupled to the counter 34 and the clock generator 38, and the clock generator 38 is coupled to the unit bit detector 12, the counter 34 and the frequency compensator 36.

In FIG. 5, the unit bit detector 12 can be the unit bit detector 12a shown in FIG. 1 or the unit bit detector 12b shown in FIG. 3; operations of the decoder 14 and the buffer 16 shown in FIG. 5 can be derived from the decoder 14 and the buffer 16 in FIG. 1 and FIG. 3. That is, by cooperation of the unit bit detector 12, the decoder 14 and the buffer 16, each data bit in the signal Din can be identified and presented in the data D2. The sampling clock CLK required by operation of the unit bit detector 12 is provided by the clock generator 38.

According to the data D2, the pattern recognizer 32 recognizes regular packets which periodically appear in the signal Din. For example, in the USB specification, there is a start of frame (SOF) packet every fixed time (e.g., one-thousandth seconds); i.e., a time interval between every two consecutive SOF packets is a constant, and number of data bits (cycles of the clock data) covered by the time interval is thus a known constant. According to the principle, the invention extracts one or more related timings.

According to each data bit provided by the decoder 14, the buffer 16 and the data D2, the pattern recognizer 32 recognizes the regular packets in the signal Din, and triggers a flag FG whenever a regular packet is identified. The counter 34 counts edges (e.g., rising and/or falling edges) provided by the clock generator 38 according to the flag FG and provides a count CV; the frequency compensator 36 provides a signal CTRL according to the count CV. The signal CTRL is a control signal; in response to the signal CTRL, the clock generator 38 adjusts timing of the sampling clock CLK.

It is assumed that a frequency of the sampling clock CLK is f_clk, and a frequency of the data clock is f_d. To synchronize the sampling clock CLK with the data clock is to maintain a fixed relation f_clk=L*f_d between the frequencies f_clk and f_d, wherein the quantity L is a constant less than, equal to or greater than 1. Because the time interval between consecutive regular packets is fixed, number of cycles of the sampling clock CLK included in the time interval is also known. For example, assuming the data clock has Q cycles during the time interval, then the sampling clock will have Q*L cycles during the time interval. Accordingly, the counter 34 is arranged to count number of cycles of the sampling clock CLK during the time interval, and reflect the counting result in the count CV. If the count CV shows that the number of cycles of the sampling clock CLK is less than the expected cycle number Q*L during the time interval, the frequency of the sampling clock CLK is too low, and the frequency compensator 36 accordingly controls the clock generator 38, such that the clock generator 38 increases the frequency of the sampling clock. On the other hand, if the count CV of the counter 34 shows that the cycle number of the sampling clock is greater than the expected cycle number Q*L between two consecutive regular packets, the frequency of the sampling clock CLK is too high, and the frequency compensator 36 therefore causes the clock generator 38 to lower frequency of the sampling clock CLK. As the clock generator 38 is controlled by feedback of the pattern recognizer 32, the counter 34 and the frequency compensator 36, the sampling clock CLK will synchronize with the data clock (i.e., there is fixed frequency and/or phase relation between the two clocks); equivalently, timing of the data clock is extracted from the signal Din.

In the pattern recognizer 32, the pattern register 40 is coupled to the data comparator 42. The pattern register 40 records bit pattern of the regular packet (e.g., the SOF packet), and the data comparator 42 compares if the bit pattern of the regular packet appears in the data D2. If the bit pattern of the regular packet occurs in the data D2, the data comparator 42 triggers the flag FG.

In the clock generator 38, the control processor 44 is coupled to the digital controlled oscillator 46 and the frequency divider 48; the digital controlled oscillator 46 is coupled to the frequency divider 48 and the control processor 44. The digital controlled oscillator 46 generates a clock CKO, the frequency divider 48 (e.g., a pulse swallower) adjusts the frequency of the clock CK0 to produce the sampling clock CLK by swallowing one or multiple pulses of the clock CK0. The control processor 44 controls the digital controlled oscillator 46 and the frequency divider 48 according to the signal CTRL, e.g., causes the digital control oscillator 36 to change the frequency of the clock CK0, and/or causes the frequency divider 48 to change its frequency division ratio.

In the embodiments shown in FIG. 1, FIG. 3 and FIG. 5, various techniques can be applied to generate the sampling clock CLK and to trigger the sampling module 18 in the unit bit detector 12a and 12b. Assuming the frequency of the data clock is f_d, and the sampling rate of the sampling module 18, triggered by the sampling clock CLK, is a K multiple of the frequency f_d, wherein K can be larger than 1. In an embodiment of sampling by frequency multiplication, the frequency f_s of the sampling clock CLK is a K multiple of the frequency f_d, and each cycle of the sampling clock CLK triggers a sampling of a sampled value. In an embodiment of multi-phase sampling, the sampling clock CLK includes a number K of auxiliary clocks, the K auxiliary clocks are of a same frequency f_d, and a phase difference between the k-th auxiliary clock (for k=1 to K) and the first auxiliary clock is 2*pi*(k−1)/K; each cycle of each auxiliary clock triggers a sampling of a sampled value. By triggers of the K auxiliary clocks, the sampling module 18 also achieves a sampling rate of K*f_d. In a hybrid embodiment mixing frequency multiplication and multi-phase sampling, the sampling clock CLK includes a number K1 of auxiliary clocks, the numbers K1 and K are different; for example, the number K1 can be greater than 1 but less than K. The K1 auxiliary clocks are of a same frequency f_d*K/K1, a phase difference between the k-th auxiliary clock (k1=1 to K1) and the first auxiliary clock is 2*pi*(k−1)/K1, and each cycle of each auxiliary clock triggers a sampling of a sampled value.

In an embodiment, the apparatuses 10a, 10b and 30 are implemented by digital circuitry rather than analog circuitry (such as oscillators of capacitor, inductor, resistor, as well as bandgap reference circuits and passive elements, etc). To sum up, comparing to prior arts, the invention can extract data by free-running clock of open loop, does not need to precisely lock to the data clock, and thus does not require expensive external oscillator (e.g., crustal oscillator) and associated pin(s), also does not have to adopt built-in trimmed oscillator of high cost and large layout area; the invention further owns better ability to resist variations of temperature, voltage and process. Since the invention does not need to lock to the data clock by closed feedback loop, the invention has faster response speed, and does not need to spend a long time to wait clock lock. Furthermore, the invention can generally apply to applications of different interface specifications, and implement data extraction for interface signals of different interface specifications. The invention can also maintain correct extraction for many data bits without being constrained by how well the sampling clock is synchronized with the data clock. In addition, the buffer in each embodiment of the invention enhances error tolerance of data extraction. Data extraction of the invention can be further expanded to include timing extraction of data clock according to result of data extraction.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of data extraction for extracting data from a signal; the signal comprising a plurality of data bits, and the method comprising:
sampling the signal for obtaining a plurality of sampled values;
providing a reference sample quantity when the sampled values transit;
providing a unit bit sample quantity according to the reference sample quantity; and
corresponding each of the sampled values to each of the data bit according to the unit bit sample quantity;
for a first number of consecutive sampled values which correspond to a same logic value, if a difference between an integer multiple of the unit bit sample quantity and the first number is not less than a predetermined value, triggering an indication signal; and
resetting the unit bit sample quantity in response to the indication signal.

2. The method of claim 1 further comprising:
identifying a sync sequence in the signal; and
while providing the unit bit sample quantity, providing the unit bit sample quantity when the sampled values of the sync sequence transit.

3. The method of claim 1 further comprising:
comparing a plurality of the reference sample quantities, and providing the unit bit sample quantity according to comparison result.

4. The method of claim 1 further comprising:
calculating a common factor of a plurality of the reference sample quantities, and providing the unit bit sample quantity according to the common factor.

5. The method of claim 1 further comprising:
buffering a number of the sampled values; and
when the indication signal is triggered, corresponding each of the buffered sampled values to each of the data bit according to the reset unit bit sample quantity.

6. An apparatus of data extraction arranged to extract data from a signal; the signal comprising a plurality of data bits, and the apparatus comprising:
a unit bit detector comprising:
a sampling module for sampling the signal to obtain a plurality of sampled values; and
a data length calculator for providing a reference sample quantity when the sampled values transit, wherein the unit bit detector is arranged to provide a unit bit sample quantity according to the reference sample quantity; and
a decoder for corresponding each of the sampled values to each of the data bit according to the unit bit sample quantity;
wherein when the decoder corresponds each of the sampled values to each of the data bit, for a first number of consecutive sampled values which correspond to a same logic value, the decoder further triggers an indication signal if a difference between an integer multiple of the unit bit sample quantity and the first number is not less than a predetermined number; and the apparatus further comprises:
a bit refresher for resetting the unit bit sample quantity in response to the indication signal.

7. The apparatus of claim 6 further comprising:
a sync detector for identifying a sync sequence in the signal; wherein the data length calculator is arranged to provide the reference sample quantity when the sampled values of the sync sequence transit, and the unit bit detector is arranged to provide the unit bit sample quantity according to the reference sample quantity so provided.

8. The apparatus of claim 6 further comprising:
a unit bit finder for comparing a plurality of reference sample quantities, and the unit bit detector is arranged to provide the unit bit sample quantity according to comparison result.

9. The apparatus of claim 6 further comprising:
a unit bit finder for calculating a common factor of a plurality of reference sample quantity, and the unit bit detector is arranged to provide the unit bit sample quantity according to the common factor.

10. The apparatus of claim 6 further comprising:

a buffer for buffering a number of sampled values;

wherein when the indication signal is triggered, the buffer further corresponds each of the buffered sampled values to each of the data bit according to the reset unit bit sample quantity.

11. The apparatus of claim 6 further comprising:

a pattern recognizer for identifying a regular packet according to each of the data bits provided by the decoder, and triggering a flag when the regular packet is identified;

a counter for accumulating a count according to the flag;

a frequency compensator for providing a control signal according to the count; and a clock generator for adjusting timing of a clock according to the control signal; wherein the sampling module is arranged to sample according to the clock.

\* \* \* \* \*